United States Patent [19]
Klüting et al.

[11] 4,272,048
[45] Jun. 9, 1981

[54] POSITIONALLY ADJUSTABLE SEAT

[75] Inventors: Bernd Klüting, Radevormwald; Rainer Holweg, Wermelskirchen, both of Fed. Rep. of Germany

[73] Assignee: Keiper Automobiltechnik GmbH, Remscheid, Fed. Rep. of Germany

[21] Appl. No.: 898,132

[22] Filed: Apr. 20, 1978

[30] Foreign Application Priority Data

Apr. 28, 1977 [DE] Fed. Rep. of Germany ....... 2718928

[51] Int. Cl.$^3$ ............................................ F16M 13/00
[52] U.S. Cl. ......................................... 248/430; 403/1
[58] Field of Search ....................... 248/425, 429, 430; 403/1

[56] References Cited

U.S. PATENT DOCUMENTS

| 232,926 | 10/1880 | Berkholz | 403/1 X |
|---|---|---|---|
| 882,643 | 3/1908 | Lundgren | 403/1 |
| 2,631,649 | 3/1953 | Rappl | 248/430 |
| 2,953,190 | 9/1960 | Tanaka | 248/429 |
| 3,351,364 | 11/1967 | Warn et al. | 403/1 |
| 4,040,591 | 8/1977 | Pickles | 248/429 |

Primary Examiner—William H. Schultz
Attorney, Agent, or Firm—Michael J. Striker

[57] ABSTRACT

A seat component of an adjustable seat, particularly of a motor vehicle seat, is mounted on a base component for movement generally in the forward and rearward direction of the seat. A toothed rack is rigidly mounted on the seat component, and a pinion member is mounted on a driving shaft and meshes with the toothed rack. A driving element of a disk-shaped configuration is rigidly connected to the driving shaft and has a plurality of circumferentially distributed openings which receive corresponding tooth-shaped projections of the pinion member to entrain the pinion member for joint rotation with the driving shaft. The pinion member is displaceable axially of the driving shaft to engage the tooth-shaped projections in, and disengage the same from, the corresponding openings of the driving element. A spring urges the pinion member axially of the driving shaft toward the driving element, and a threaded member is mounted on a hub of the pinion member and abuts an end face of the driving shaft to determine the axially displaced position of the pinion member relative to the driving shaft. The driving shaft may be the output shaft of a motor, or the disk-shaped driving element may have a circumferential annulus of teeth thereon with which a pinion mounted on the output shaft of the motor meshes.

12 Claims, 4 Drawing Figures

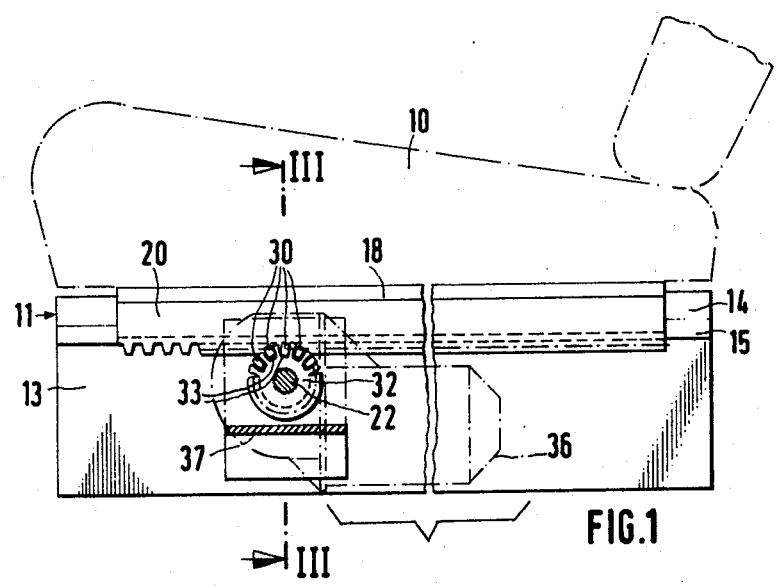
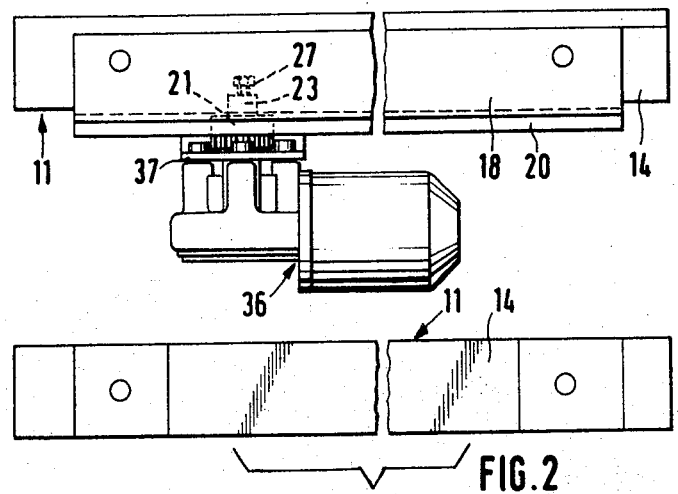

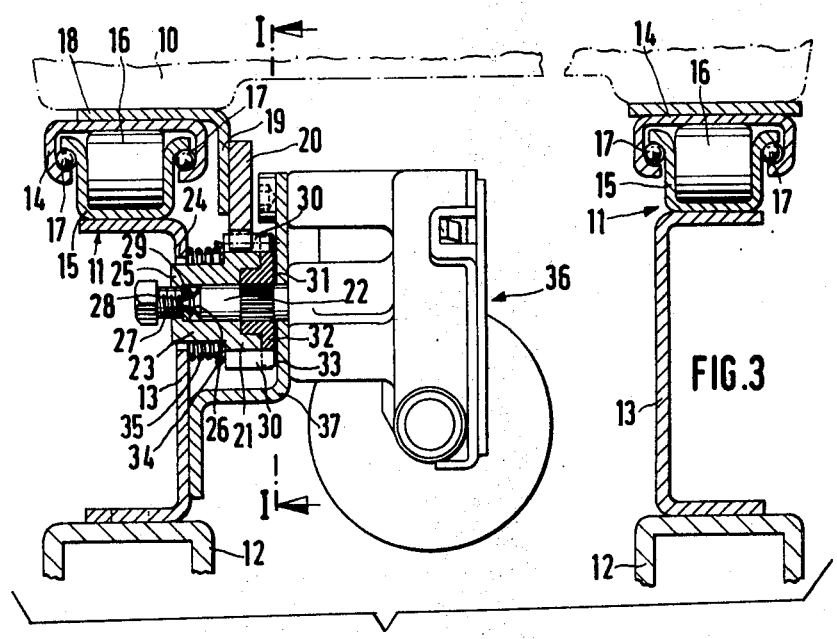
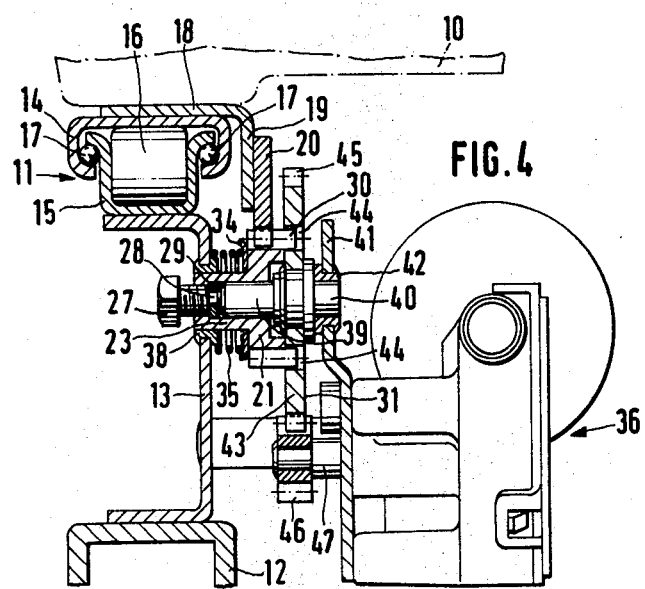

POSITIONALLY ADJUSTABLE SEAT

BACKGROUND OF THE INVENTION

The present invention relates to an adjustable seat in general, and more particularly to an adjustable seat for use in a vehicle, particularly a motor vehicle, which is positionally adjustable frontwardly and rearwardly of the seat by means of a rack-and-pinion drive.

Adjustable seats of the above-mentioned type are already known and in widespread use. Usually, the seats of this type include a seat component which is supported, via guiding tracks and support tracks, on a base component which, in turn, is connected to or forms a pair of the bottom of the motor vehicle. In this environment, it is also already known to rigidly connect a toothed rack at least with one of the support rails, and to so arrange a pinion member as to mesh with the toothed rack during the rotation thereof with a driving shaft and to thereby displace the seat component relative to the base component.

In one conventional adjustable seat of this type which is disclosed in the U.S. Pat. No. 2,953,190, one support rail is rigidly connected with the lower part of the seat component at each of the lateral sides of the seat component and forms a part of a guide track assembly. In this conventional adjustable seat, one toothed rack is rigidly connected with each of the support tracks, and a separate pinion member meshes with each of the toothed racks, each of the pinions being arranged underneath the seat component, being mounted for rotation in a bracket which is connected to the bottom of the motor vehicle, and being driven in rotation by an electromotor via a worm gear transmission. The electromotor is connected with each of the pinion members via flexible shafts or similar connecting elements, the electric motor as well as the worm gear transmission being arranged underneath the lower part of the seat component in the region between the two guide track arrangements. So long as the above-mentioned drive performs to satisfaction, it presents a very simple, inexpensive and otherwise advantageous solution to the problem of displacing the seat. However, when the electromotor or the transmission malfunctions, the seat can no longer be adjusted so that, inasmuch as the seat component will usually be in an adjusted position which is disadvantageous as far as the position of the electromotor and that of the transmission are concerned, both the electromotor and the transmission will be accessible only with difficulties for repair or replacement purposes. For this reason, it is sometimes necessary to dismount or disassemble the entire seat or at least some of the constituent components thereof. This, of course, is very disadvantageous, particularly in view of the substantial time expenditure involved in at least partially dismounting the seat only in order to repair or replace rather inexpensive parts, such as the electromotor or the transmission.

SUMMARY OF THE INVENTION

Accordingly, it is a general object of the present invention to avoid the disadvantages of the prior art.

More particularly, it is an object of the present invention to provide an adjustable seat which is not possessed of the above-enumerated disadvantages of the prior-art adjustable seats.

It is a further object of the present invention to so construct the drive for adjusting the position of the adjustable seat that the pinion member which meshes with the toothed rack can be uncoupled from the driving shaft with which the pinion member jointly rotates during the normal operation of the drive.

Yet another object of the present invention is to so construct the drive for the adjustable seat that the pinion can be easily uncoupled from the driving shaft to permit manual displacement of the seat, while it can also be easily coupled again with the driving shaft when it is desired to arrest the seat in any selected position thereof.

In pursuance of these objects and others which will become apparent hereafter, one feature of the present invention resides, in an adjustable seat, particularly for use in a vehicle, especially in a motor vehicle, which comprises, briefly stated, a base component; a seat component mounted on the base component for movement along a predetermined path relative thereto; means for moving the seat component along the path including a toothed rack rigidly connected to one of the components, a driving member, a pinion member, and means for mounting the members on the other of the components for rotation about an axis with the pinion member in mesh with the toothed rack and for axial displacement relative to each other; and means for disengageably coupling the pinion member with the driving member for joint rotation, including respective coupling portions on the members which engage and disengage each other upon the above-mentioned relative axial displacement of the members. Advantageously, the driving member includes a driving shaft, and a driving element mounted on the shaft for joint rotation therewith, the above-mentioned coupling portions of the driving member being located on the driving element. When the adjustable seat is constructed in the above-mentioned manner, it is possible for the pinion member to remain in a meshing engagement with the toothed rack even when the pinion member is released from its joint rotation with the driving shaft. This renders it possible to dispense with the time-consuming location of the tooth gaps in the toothed rack during the coupling operation which follows a decoupling operation.

In order to achieve a secure torque transmission between the driving shaft, on the one hand, and the pinion member, on the other hand, it is particularly advantageous when, in accordance with a currently preferred concept of the present invention, the mounting means mounts the pinion member in the driving shaft for rotation relative thereto and for the above-mentioned axial displacement into and out of a coupling position in which the coupling portions of the above-mentioned members engage each other, and when there are provided means for urging the pinion member toward the coupling position thereof. Then, it is also very advantageous when the pinion member has an axial end face which faces the driving element and a plurality of tooth-shaped projections which extend beyond the axial end face and constitute the above-mentioned coupling portions of the pinion member, and when the driving element is a disk and has a plurality of circumferentially distributed openings which constitute the coupling portions of the driving member and receive the tooth-shaped projections of the pinion member in the coupling position of the latter. A simple access to the manually couplable and decouplable pinion member is obtained when, according to a currently preferred facet of the present invention, the pinion member has a hub that has an end portion extending beyond the driving shaft and outwardly of the other component. In this connection, it is particularly advantageous when the driving shaft has an end face located within the end portion of the hub, and when a threaded actuating member threadingly engages the end portion of the hub and abuts the end face of the driving shaft to determine the respective axially displaced position of the pinion member on the driving shaft. Then, it is especially advantageous when the hub of the pinion member has an inwardly extending flange, and when the actuating member is threadedly accommodated in the flange.

In this context, it is further advantageous when the actuating member has an actuating portion accessible to the user of the seat and operative for rotating the actuating member relative to the hub of the pinion member to thereby change the axially displaced position of the latter relative to the driving shaft. In order to secure the actuating member against excessive threading thereof out of the flange and thus a possible loss of or damage to the actuating member, an abutment is provided on a free end portion of the actuating member which is accommodated in the hub of a pinion member and which engages behind the flange to prevent complete unthreading of the actuating member from the flange.

In accordance with a currently preferred embodiment of the present invention, it is provided that the above-mentioned other component, in order to achieve a space-saving, compact structural unit, includes a carrier member and a support member rigid with the carrier member and spaced therefrom axially of the driving shaft. Then, the mounting means includes a bearing which supports the driving shaft on the support member. Advantageously, the carrier member and the support member together bound a compartment, and the pinion member and the driving element are received in this compartment.

Under these circumstances, it is advantageous when the moving means includes a driving motor which is mounted on the support member of the other component, the above-mentioned driving shaft being an output shaft of the driving motor.

In order to assure that the pinion member is retained in its coupling position, on the one hand, and in order to achieve that the pinion member is securely pressed in its engaging position with the above-mentioned disk-shaped driving element, it is proposed in accordance with a further feature of the present invention to provide means for urging the axially displaceable one of the members toward an engaging position thereof in which the coupling projections of the members engage each other, the urging means being interposed between the other component and the axially displaceable member.

When the driving arrangement includes a motor, such as an electromotor, it may be advantageous to arrange the driving motor as close to the bottom of the vehicle as possible. For this reason, another feature of the present invention resides in the fact that the driving element is configurated as a disk having an external annulus of gear teeth, and that the moving means further includes an actuating shaft which is mounted on the other component for rotation relative thereto, a pinion mounted on the actuating shaft for joint rotation therewith and meshing with the external gear annulus of the driving member, and means for rotating the actuating shaft, such as the above-mentioned electromotor. In this context, it is particularly advantageous when the actuating shaft is the output shaft of the electromotor.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a sectional view of the seat-adjusting mechanism of the present invention taken on line I—I of FIG. 3.

FIG. 2 is a top plan view of the seat-adjusting mechanism of FIG. 1;

FIG. 3 is a sectional view taken on line III—III of FIG. 1 at a scale which is enlarged relative to that of FIGS. 1 and 2 and which substantially corresponds to the actual size; and FIG. 4 is a view analogous to FIG. 3 but illustrating a modification of the seat-adjusting mechanism in which a gear transmission is interposed between the pinion member and the output shaft of the motor.

DESCRIPTION OF THE PREFERRED EMBODIMENTS

Referring now to the drawing in detail, and first to FIG. 1 thereof, it may be seen that the reference numeral 10 has been used to designate a seat component which is shown only in dash-dotted lines. The lower side of the seat component 10 is connected, at each of the lateral regions of the seat component 10, with a guide track arrangement 11. This guide track arrangement 11 is supported on a bottom 12 of a motor vehicle by means of a base component or foundation bracket 13.

As can be most clearly ascertained from FIG. 3, the guide track arrangement 11 includes a support track 14 and a guiding track 15 which is connected to the base component 13. A plurality of roller bodies 16 supports the support track 14 of the guiding track 15 for movement longitudinally thereof. On the other hand, rows of spherical elements 17 guide the support track 14 on the guiding track 15 in the lateral direction of the latter.

A connecting bracket 18 of a cross-sectionally L-shaped configuration is rigidly connected to that support track 14 which is arranged at one of the lateral regions of the seat component 10. The connecting bracket 18 has an arm 19 which extends internally beyond the guide track arrangement 11, and a toothed rack 20 is rigidly connected thereto. A pinion member 21 meshes with the toothed rack 20. In the embodiment illustrated in FIG. 3, the pinion member 21 is mounted on a driving shaft 22 for rotation and axial displacement relative thereto. The pinion member 21 has a hub 23 which is supported on the driving shaft 22. The hub 23 extends beyond the free end of the driving shaft 22 and passes through a cutout 24 in the base component 13.

The hub 23 of the pinion member 21 has at its free end which extends to the exterior of the base member 13 a radially inwardly extending collar 25 which is provided with an internal thread. An actuating screw 27 is threadedly received in the internal thread of the inwardly extending collar 25 of the hub 23, the actuating screw 27 abutting an end face 26 of the driving shaft 22. This actuating screw 27 has an actuating end which is located at the exterior of the base component 13 and so configurated as to render it possible to engage an adjusting tool, such as a wrench, therewith. That end 28 of the actuating screw 27 which is remote from the above-mentioned actuating portion is provided with a pin-shaped projection by means of which a disk-shaped member 29 is riveted to the actuating screw 27. This disk-shaped member 29 serves as an abutment which prevents the actuating screw 27 from being fully unthreaded from the collar 25 of the pinion member 21 on the accomplishment of the coupling operation.

The pinion member 21 which has a plurality of teeth at its outer circumference, is also provided with projecting tooth segments 30 which cooperate, in a manner of a jaw coupling, with a driving element 31 which is connected to the driving shaft 22 for joint rotation therewith. This driving element 31 includes a disk-shaped body 32, and is provided at the outer circumference of the body 32 with a plurality of openings 33 the number and distribution of which correspond to those of the tooth segments 30 and which are cross-sectionally accommodated to the configuration of the tooth segments 30.

A slidng plate 34 embraces the hub 23 of the pinion member 21 and abuts the gear teeth annulus of the pinion member 21. A helical compression spring 35 is arranged between this sliding plate 34 and the base component 13 and serves as a biasing arrangement which urges the pinion member 21 toward its coupling position.

In the embodiment which is revealed in FIG. 3, the driving shaft 22 is the output shaft of a drivng motor 36 which is mounted on a support member 37 that is connected with the base component 13 that constitutes a carrier member. The support member 37 is Z-shaped in cross-section and is so connected to the base component 13, for instance, by welding, that the base component 13 and the support member 37 together bound a compartment therebetween. The driving shaft 22 penetrates into the above-mentioned compartment in order to support the pinion member 21 and the driving element 32 therein.

In the modification which is revealed in FIG. 4, the pinion member 21 is supported, at the periphery of its hub 23, in a bushing 38 supported in the base component 13, on the one hand, while the bearing bore in the hub 23 of the pinion member 21 is supported on a support shaft 39 for individual rotation and axial displacement. The support shaft 39 is supported, at its one end which carries a bearing pin 40, in a bushing 42 which is supported in a support member 41, while the other end of the support shaft 39 is supported in the bore of the hub 23 of the pinion member 21, the hub 23, as already mentioned previously, being rotationally and axially displaceably supported in the base component 13.

A disk-shaped driving element 43 is connected to the central region of the support shaft 39 for joint rotation therewith. The driving element 43 is provided, at the region juxtaposed with the tooth segments 30 of the pinion member 21, with openings 44 which, as to their shape and dimensions, correspond to the tooth projections 30 of the pinion member 21. The disk-shaped driving element 43 is provided, at its outer periphery with an annulus of teeth 45, and a pinion 46 which is connected with a driving shaft 47, meshes with the teeth 45. The driving motor 36 which has the actuating shaft 47 as its output shaft, is supported on the support member 41 which is arranged at a distance from the base component 13.

In both embodiments of FIGS. 3 and 4, the pinion member 21 is located in its coupling position so that the angular displacement to which the driving shaft 22 or the actuating shaft 47 is subjected is transmitted to the pinion member 21 which, because of its meshing engagement with the toothed rack 20, displaces the latter in one or the other direction, depending on the sense of rotation of the pinion 21.

Even though the exemplary embodiments of the present invention which are illustrated in FIGS. 3 and 4 differ from one another in some structural details, the function thereof is similar if not the same. In both instances, the tooth segments 30 of the pinion member 21 can be withdrawn from the openings 33 or 44 of the driving element 32 or 43 by rotating the actuating screw 27 in the proper direction, as a result of the fact that the end of the shaft 28 of the actuating screw 27 abuts the end face 26 of the driving shaft 22 or of the support shaft 39. During the rotation of the actuating screw 27, the pinion member 21 is displaced against the force of the helical spring 35 which acts as a force accumulator, due to the threaded engagement of the shank of the actuating screw 27 with the internal thread of the collar 25 of the hub 23 of the pinion member 21. As a result of this, the tooth segments 30 are released from their engagement with the driving elements 32 or 43. When this happens, the seat component 10 can be manually displaced either forwardly or rearwardly.

When it is desired or required that the seat component 10 be again arrested in its selected position following the manual adjustment of the position thereof, then the actuating screw 27 is to be rotated in the opposite direction so that the tooth segments 30 of the pinion member 21 reestablish their engagement with the respective driving elements 32 or 43. In most instances, the transmission of the driving motor 36 is constructed as a self-locking worm gear transmission so that the arresting of the seat component 10 is assured provided that the motor 36 is not energized.

It will be understood that each of the elements described above, or two or more together, may also find a useful application in other types of constructions differing from the types described above.

While the invention has been illustrated and described as embodied in an adjustable seat for use in a motor vehicle, it is not intended to be limited to the details shown, since various modifications and structural changes may be made without departing in any way from the spirit of the present invention. So, for instance, it is also possible and contemplated by the present invention to use claw-shaped projections on the pinion member 21 as well as on the driving elements 32 or 43, instead of the tooth segments 30. In addition thereto, it is also possible to use a manually actuated adjusting arrangement instead of the driving motor 36. In this instance, the handle of this manually operated adjusting arrangement may be connected to a torsion-spring brake in order to be able to arrest the seat component 10 in any selected position thereof.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An adjustable seat, particularly for use in a motor vehicle, comprising a base component; a seat component mounted on said base component for movement along a predetermined path relative thereto; means for moving said seat component along said path, including a toothed rack rigidly connected to one of said components, a driving member, a pinion member, and means for mounting said members on the other of said components for rotation about an axis, said pinion member being in mesh with said toothed rack and being axially displaceable relative to said driving member; and means for disengageably coupling said pinion member with said driving member for joint rotation including respective coupling portions on said members which engage and disengage each other upon the relative axial displacement of said pinion member, said driving member including a driving shaft, and a driving element mounted on said shaft for joint rotation therewith, said coupling portions of said driving member being located on said driving element; said other component including a carrier member and a support member rigid with said carrier member and spaced therefrom axially of said driving shaft; said mounting means further including a bushing to support said driving shaft on said support member; and said carrier member and said support member together bounding a compartment in which said pinion member and said driving element are positioned.

2. An adjustable seat as defined in claim 1, wherein said mounting means mounts said pinion member on said driving shaft for rotation relative thereto and for said axial displacement into and out of a coupling position in which said coupling portions of said members engage each other.

3. An adjustable seat as defined in claim 2, and further comprising means for urging said pinion member toward said coupling position.

4. An adjustable seat particularly for use in a motor vehicle, comprising a base component; a seat component mounted on said base component for movement along a predetermined path relative thereto; means for moving said seat component along said path, including a toothed rack rigidly connected to one of said components, a driving member, a pinion member, and means for mounting said members on the other of said components for rotation about an axis, with said pinion member in mesh with said toothed rack and for axial displacement relative to each other; and means for disengageably coupling said pinion member with said driving member for joint rotation, including respective coupling portions on said members which engage and disengage each other upon said relative axial displacement of said members, said driving member including a driving shaft, and a driving element mounted on said shaft for joint rotation thereof; said coupling portions of said driving member being located on said driving element, said mounting means mounting said pinion member on said driving shaft for rotation relative thereto and for said axial displacement into and out of a coupling position in which said coupling portions of said members engage each other, means for urging said pinion member toward said coupling position, said pinion member having an axial end face which faces said driving element and a plurality of tooth-shaped projections which extend beyond said axial end face and constitute said coupling portions of said pinion member; and said driving element being a disk and having a plurality of circumferentially distributed openings which constitute said coupling portions of said driving member and receive said tooth-shaped projections of said pinion member in said coupling position.

5. An adjustable seat particularly for use in a motor vehicle, comprising a base component; a seat component mounted on said base component for movement along a predetermined path relative thereto; means for moving said seat component along said path, including a toothed rack rigidly connected to one of said components, a driving member, a pinion member, and means for mounting said members on the other of said components for rotation about an axis with said pinion member in mesh with said toothed rack and for axial displacement relative to each other; and means for disengageably coupling said pinion member with said driving member for joint rotation, including respective coupling portions on said members which engage and disengage each other upon said relative axial displacement of said members, said driving member including a driving shaft, and a driving element mounted on said shaft for joint rotation therewith; said coupling portions of said driving member being located on said driving element, said mounting means mounting said pinion member on said driving shaft for rotation relative thereto and for said axial displacement into and out of a coupling position in which said coupling portions of said members engage each other, said pinion member having a hub having an end portion which extends beyond said driving shaft and outwardly of said other components to be accessible to the user of the seat thereat.

6. An adjustable seat as defined in claim 5, wherein said driving shaft has an end face located within said end portion of said hub; and further comprising a threaded actuating member which threadingly engages said end portion of said hub and abuts said end face of said driving shaft to determine the respective axially displaced position of said pinion member on said driving shaft.

7. An adjustable seat as defined in claim 6, wherein said actuating member has an actuating portion accessible to the user of the seat and operative for rotating said actuating member relative to said hub of said pinion member to thereby change said axially displaced position of the latter relative to said driving shaft.

8. An adjustable seat as defined in claim 6, wherein said hub of said pinion member has an inwardly extending flange; and wherein said actuating member is threadedly accommodated in said flange.

9. An adjustable seat as defined in claim 8, wherein said actuating member has a free end portion accommodated in said hub of said pinion member beyond said flange, and an abutment on said free end portion which prevents complete unthreading of said actuating member from said flange.

10. An adjustable seat as defined in claim 1, wherein said moving means further includes a driving motor which is mounted on said support member of said other component; and wherein said driving shaft is an output shaft of said driving motor.

11. An adjustable seat as defined in claim 10; wherein said driving element is a disk having an external annulus of gear teeth; and wherein said moving means further includes an actuating shaft, means for mounting said actuating shaft on said other component for rotation relative thereto, a pinion mounted on said actuating shaft for joint rotation therewith and meshing with said external gear annulus of said driving member, and means for rotating said actuating shaft.

12. An adjustable seat as defined in claim 1; and further comprising means for urging the axially displaceable one of said members toward an engaging position thereof in which said coupling portions of said members engage each other, said urging means being interposed between said other component and said axially displaceable member.

* * * * *